M. BICHEROUX.
APPARATUS FOR CUTTING PLATE GLASS.
APPLICATION FILED OCT. 15, 1913.
1,105,610.
Patented Aug. 4, 1914.
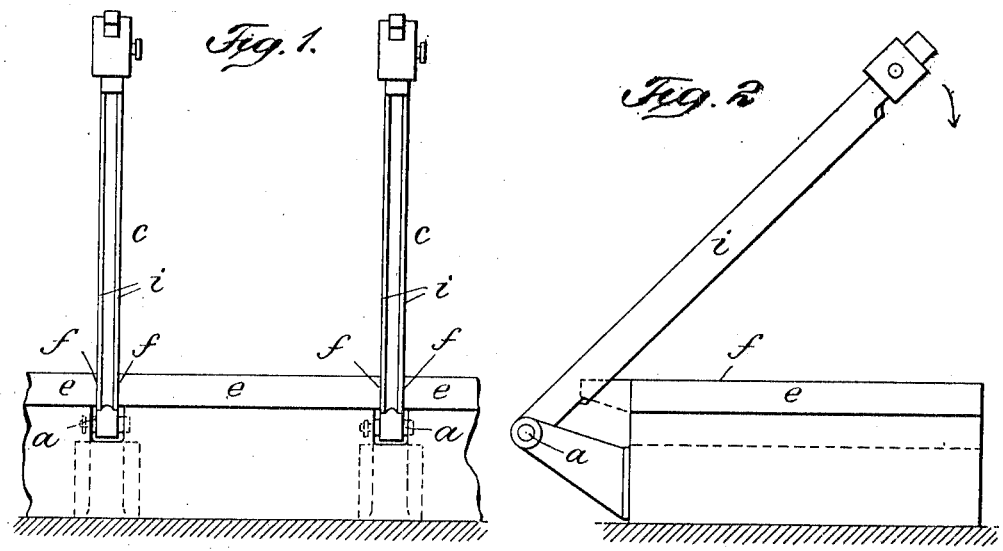
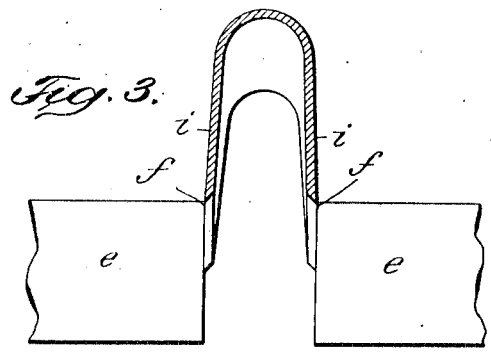
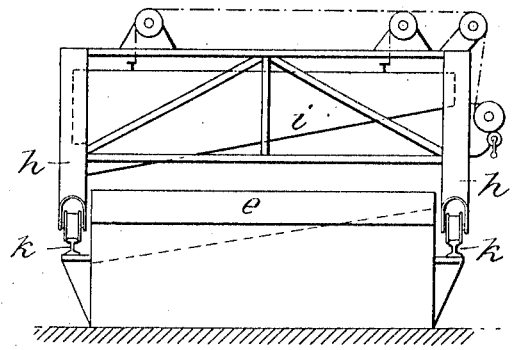
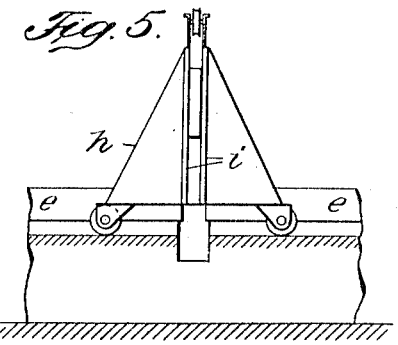

UNITED STATES PATENT OFFICE.

MAX BICHEROUX, OF AIX-LA-CHAPELLE, GERMANY, ASSIGNOR TO BICHEROUX, LAMBOTTE AND CIE., GESELLSCHAFT MIT BESCHRANKTER HAFTUNG, OF HERZOGENRATH, RHINELAND, GERMANY.

APPARATUS FOR CUTTING PLATE-GLASS.

1,105,610.  Specification of Letters Patent.  Patented Aug. 4, 1914.

Original application filed July 25, 1912, Serial No. 711,439. Divided and this application filed October 15, 1913. Serial No. 795,303.

*To all whom it may concern:*

Be it known that I, MAX BICHEROUX, a subject of the King of Belgium, residing at Aix-la-Chapelle, Rhineland, Germany, have invented a new and useful Apparatus for Cutting Plate-Glass, of which the following is a specification.

This invention relates to novel and efficient apparatus for cutting plate glass in plastic condition into units, the present application being a division of an application filed by me on the 25th day of July, 1912, under Serial No. 711,439.

In the accompanying drawing: Figure 1 is a front view of part of an apparatus embodying my invention; Fig. 2, an end view thereof; Fig. 3, an enlarged cross-section through the cutter, showing adjoining tables in view; Fig. 4, a front view of a modification of the invention; and Fig. 5, an end view thereof.

The letters $e, e$ represent a number of adjacent pouring tables or surfaces, which are so arranged, that an open space or gap is left, between each pair of adjoining tables. Through each of these open spaces, there is free to move, in a vertical plane, a cutter $c$, which in Figs. 1–3 is by pin $a$ shown to be pivoted to the tables. Each cutter comprises two spaced parallel cutting blades, $i$, which, when the cutter is lowered, as indicated by the arrow in Fig. 2, will move along the two stationary edges $f, f$, of the adjacent tables $e$, thus cutting the glass. If desired, the two coöperating blades $i$ may be made integral by constructing the cutter of U-shaped cross section (Fig. 3).

The cutter is preferably so constructed, that its blades when disengaged from the space between the tables are at a distance apart slightly greater than the width of said space, so that when the cutter is lowered, its blades will exert a pressure laterally against the edges of the tables. This construction of the blades has the advantage of making a very clean cut and of imparting greater strength to the cutter itself.

In Figs. 4–5, the cutter instead of being pivoted, is adapted to move vertically between the tables, its ends being guided in parallel uprights $h$ which may be fixed or may be movable along rails or similar guides $k$ as shown, so that they may be moved from space to space.

I claim:

1. In apparatus for cutting plate glass in plastic condition, the combination with two spaced, stationary, pouring tables in the same plane and having parallel cutting edges adjacent to the space between them, of two cutting blades reciprocating in substantially vertical planes and in position to co-act with said edges, respectively, to divide the glass along the margin of each table.

2. In apparatus for cutting plastic plate glass, the combination with two spaced pouring tables fixed in the same plane and having cutting edges adjacent to the space between them, of two connected cutting blades adapted to co-act with said edges, respectively, and arranged to be moved simultaneously in planes perpendicular to the tables into and out of said space to sever along said edges plastic glass spanning the space.

3. In apparatus of the class described, the combination with spaced pouring tables fixed in the same plane and having substantially parallel cutting edges adjacent to the space between them, of two parallel cutting blades having their cutting margins normally slightly more widely separated than are said edges, adapted to co-act with the latter, respectively, and arranged to be reciprocated in the vertical plane of said space to sever glass upon the tables.

4. In apparatus of the class described, the combination with spaced pouring tables fixed in the same plane and having approximately parallel cutting edges next the space between them, of a cutter consisting of two blades connected along their non-cutting margins, having cutting margins adapted to co-act simultaneously with said edges, respectively, and arranged to be forcibly moved into and out of said space to sever and space glass extending across the latter.

MAX BICHEROUX

Witnesses:
ALBERT MEYER,
GUSTAV GERLACH.